(12) United States Patent
Ahmadi et al.

(10) Patent No.: US 8,175,022 B2
(45) Date of Patent: May 8, 2012

(54) TRANSMISSION OF SYSTEM CONFIGURATION INFORMATION IN MOBILE WIMAX SYSTEMS

(75) Inventors: Sassan Ahmadi, Portland, OR (US); Shantidev Mohanty, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 1113 days.

(21) Appl. No.: 11/960,539

(22) Filed: Dec. 19, 2007

(65) Prior Publication Data

US 2009/0161591 A1 Jun. 25, 2009

(51) Int. Cl.
*H04H 20/71* (2008.01)
*H04W 4/00* (2009.01)
(52) U.S. Cl. ........................................ 370/312; 370/330
(58) Field of Classification Search ........................ None
See application file for complete search history.

(56) References Cited

U.S. PATENT DOCUMENTS

| 5,930,706 | A | * | 7/1999 | Raith | 455/422.1 |
| 7,496,113 | B2 | * | 2/2009 | Cai et al. | 370/474 |
| 2006/0154672 | A1 | * | 7/2006 | Jung et al. | 455/450 |
| 2008/0165738 | A1 | * | 7/2008 | Barber | 370/331 |
| 2008/0198774 | A1 | * | 8/2008 | Li | 370/280 |
| 2010/0020732 | A1 | * | 1/2010 | Gaddam et al. | 370/310 |

OTHER PUBLICATIONS

Pending U.S. Appl. No. 11/907,808, Device, System, and Methos for Partitioning and Framing Communication Signals in Broadband Wireless Access Networks, Sassan Ahmadi et al., filed Oct. 17, 2007.

* cited by examiner

*Primary Examiner* — John Blanton
(74) *Attorney, Agent, or Firm* — Cool Patents, P.C.; Kenneth J. Cool

(57) ABSTRACT

The particular frame in a super-frame using orthogonal frequency division multiple access techniques will contain system configuration information in the super-frame header. This super-frame header may be located at a fixed offset from the initial preamble of the frame. In some embodiments, the system configuration information may be located in a broadcast channel section of the super-frame header. In some embodiments, the particular frame may overlap a legacy OFDMA frame in time and in OFDMA sub-channels, so that the two frames share some time and sub-channel resources.

18 Claims, 9 Drawing Sheets

| Index | MSCI fields in super-frame header (SFH) | Size (bits) | Notes |
|---|---|---|---|
| 1 | MSCI count | 4 | To indicate if any fields of MSCI has changed since last reported |
| 2 | Duplex mode | 1 | If set indicates TDD or FDD duplexing modes |
| 3 | TTG | 16 | |
| 4 | RTG | 8 | |
| 5 | DL frequency | 32 | |
| 6 | UL frequency | 32 | |
| 7 | BS_ID | 48 | This includes operator ID as well |
| 8 | Frame duration code | 8 | |
| 9 | Frame number | 24 | |
| 10 | MAC version | 2 | |
| 11 | PHY version | 2 | |
| 12 | Number of Transmit (TX) antennas | 2 | Corresponding; e.g., to 1,2, and 4 TX antennas |
| 13 | Cell type | 2 | Corresponding; e.g., to pico-cell, femto-cell, micro-cell, macro-cell |
| 14 | System bandwidth | 2 | Corresponding; e.g., to 5, 10, 20 MHz |
| 15 | Cyclic prefix (CP) length | 2 | Corresponding; e.g., to 1/4, 1/8, 1/16, and 1/32 |
| 16 | DL/UL Ratio | 4 | In TDD Systems only |
| 17 | Uplink load indicator | 1 | When set indicate that the uplink capacity is reached, allowing MS to search for another BS or RS (Relay Station) |
| 18 | Relay station (RS) or BS indicator | 1 | If set indicates whether this is fully functional or partially functional BS or RS |
| 19 | Default RSSI and CINR averaging parameters | 8 | |
| 20 | BS EIRP | 16 | |
| 21 | $EIRxP_{IR,MAX}$ | 16 | |
| 22 | Start of ranging code groups | 8 | |
| 23 | Initial ranging interval | 8 | |
| 24 | Initial ranging codes | 8 | |
| 25 | HO_ranging_start | 8 | |
| 26 | HO_ranging_end | 8 | |
| 27 | Start of ranging codes grouip | 8 | |
| 28 | Initial ranging back off start | 8 | |
| 29 | Initial ranging back off end | 8 | |

FIG. 4

TRANSMISSION OF SYSTEM CONFIGURATION INFORMATION IN MOBILE WIMAX SYSTEMS

BACKGROUND

Mobile Worldwide Interoperability for Microwave Access (WiMAX) is a broadband wireless access technology based on Institute of Electrical and Electronics Engineers (IEEE) 802.16-2004 as amended by IEEE 802.16e-2005 (released Feb. 28, 2006) (hereinafter "IEEE 802.16e"). Mobile WiMAX utilizes a scalable orthogonal frequency division multiple access (OFDMA) scheme to deliver wireless broadband packet data services to mobile terminals. In mobile WiMAX, the system configuration information is transmitted from the base station (BS) to the subscriber stations (SSs) by using Downlink Channel Descriptor (DCD) and Uplink Channel Descriptor UCD) messages. The DCD and UCD messages are typically contained in the downlink section of a time division duplex (TDD) frame and similarly in the downlink frame in frequency division duplex (FDD) systems, and their location in that section is pointed to by an information element (IE) in the downlink medium access protocol (MAP). To acquire this information, the SS must therefore synchronize on the radio frame, receive and decode the frame control header (FCH) and the downlink (DL) MAP, then process and receive the downlink burst where the system configuration information (also referred to as broadcast channel (BCH)) is located. That is when the SS can make a decision on the attachment to the current BS. Furthermore, the DCD/UCD contains some optional fields that are not necessary for the standard operation of the SS and the rate at which certain information in DCD/UCD is repeated and/or updated varies from one field to another. Due to large size of the DCD/UCD message, this information is broadcasted periodically in large intervals. The SS cannot continue with network entry/re-entry procedure before system configuration information or the broadcast channel is successfully acquired. The scan latency would increase as a result of an increase in initialization time and the SS would consume more power during DCD/UCD acquisition.

BRIEF DESCRIPTION OF THE DRAWINGS

Some embodiments of the invention may be understood by referring to the following description and accompanying drawings that are used to illustrate embodiments of the invention. In the drawings:

FIG. 4 shows a table of system configuration information included in the super-frame header, according to an embodiment of the invention.

DETAILED DESCRIPTION

Figure 1:
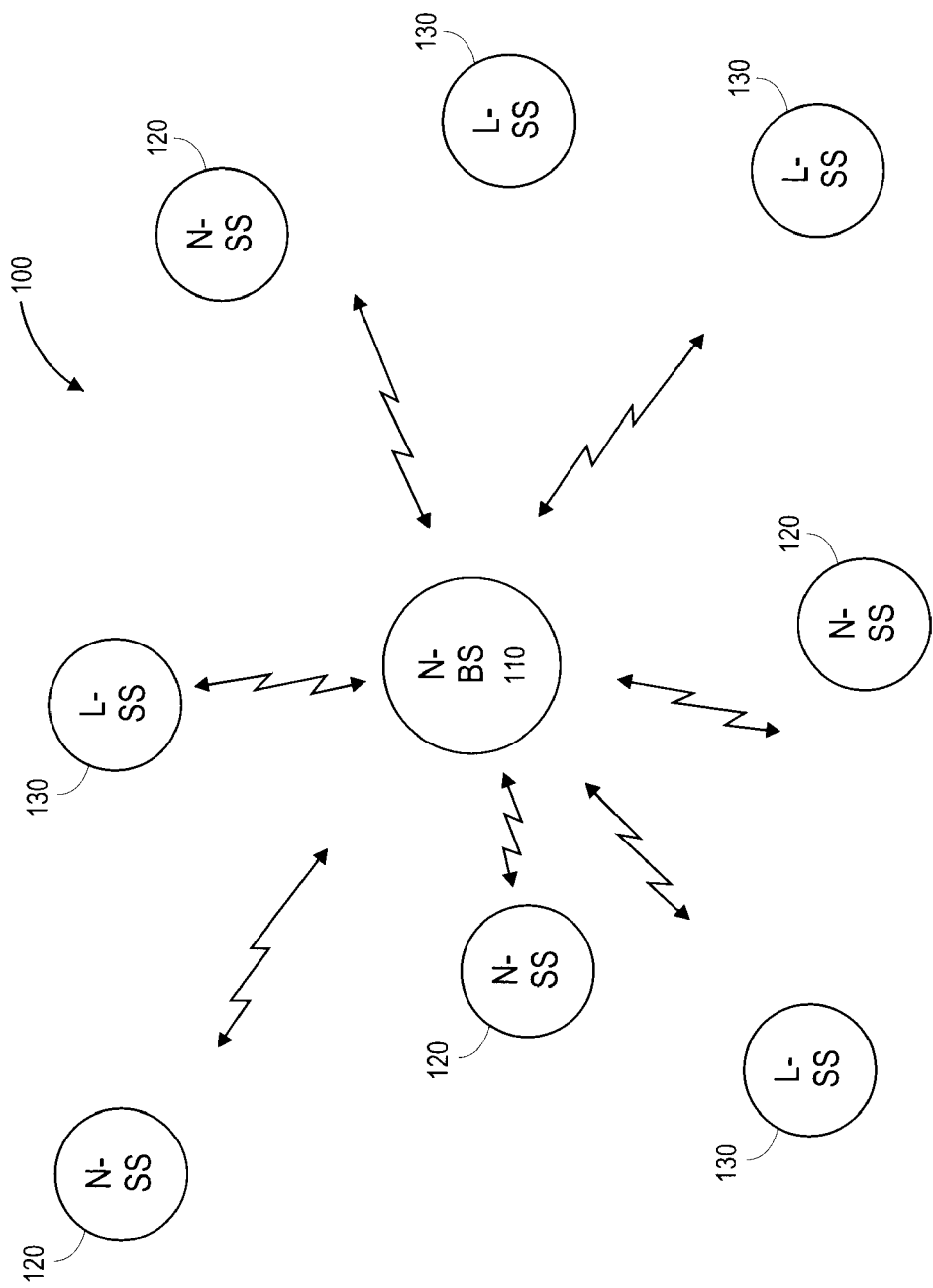
FIG. 1 shows a wireless communications network, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a machine-readable medium, which may be read and executed by one or more processors to enable performance of the operations described herein. A machine-readable medium may include any mechanism for storing, transmitting, and/or receiving information in a form readable by a machine (e.g., a computer). For example, a machine-readable medium may include a tangible storage medium, such as but not limited to read only memory (ROM); random access memory (RAM); magnetic disk storage media; optical storage media; a flash memory device, etc. A machine-readable medium may also include a propagated signal which has been modulated to encode the instructions, such as but not limited to electromagnetic, optical, or acoustical carrier wave signals.

The term "wireless" and its derivatives may be used to describe circuits, devices, systems, methods, techniques, communications channels, etc., that communicate data by using modulated electromagnetic radiation through a non-solid medium. The term does not imply that the associated devices do not contain any wires, although in some embodiments they might not. The term "mobile wireless device" is used to describe a wireless device that may be in motion while it is communicating.

Various embodiments of the invention may place configuration information for an OFDMA wireless network, e.g., a mobile WiMAX network, in the header field of a super frame, rather than in the conventional location in the downlink data section of a frame. Placing this information at a fixed location earlier in the frame may save processing time and power in the subscriber stations that need this information. Further, repeating the information at predictable intervals (e.g., every nth super-frame) may improve the efficiency of obtaining the information by simplifying the system configuration acquisition procedure.

FIG. 1 shows a wireless communications network, according to an embodiment of the invention. In network 100, a new base station (N-BS) 110 may control communications with multiple subscriber stations (SS). The 'new' indicates that the base station has some or all of the novel features described herein. New subscriber stations (N-SS) 120 may also have some or all of the novel features described herein, and may therefore take advantage of the novel capabilities of the N-BS 110. Since a base station with those capabilities should also be able to communicate with legacy subscriber stations that cannot support those capabilities, legacy subscriber stations (L-SS) 130 are also shown in the network. In the illustrated network, communications between base station N-BS 110 and subscriber stations N-BS 130 and L-SS 120 follow the techniques of orthogonal frequency division multiple access (OFDMA), in which multiple sub-channels, each operating at a different frequency, are transmitted/received at the same time. The basic concepts of OFDMA are known to those of skill in the relevant art, and are not repeated here.

FIG. 2 show a breakdown of a super-frame into frames, sub-frames, and OFDMA symbols, according to an embodiment of the invention. A super-frame consists of an integer multiple of radio frames aggregated together in a serial manner, with each frame starting immediately after the preceding frame. Every super-frame may start with a super-frame header (SFH) in the first frame, and the SFH may contain system configuration information, paging, or other broadcast information. The illustrated example shows a super-frame consisting of four frames. In some deployment scenarios, specific contents of an SFH, such as specific types of network configuration information, may be repeated at intervals of every 'n' super-frames, where n is an integer.

Figure 2A:
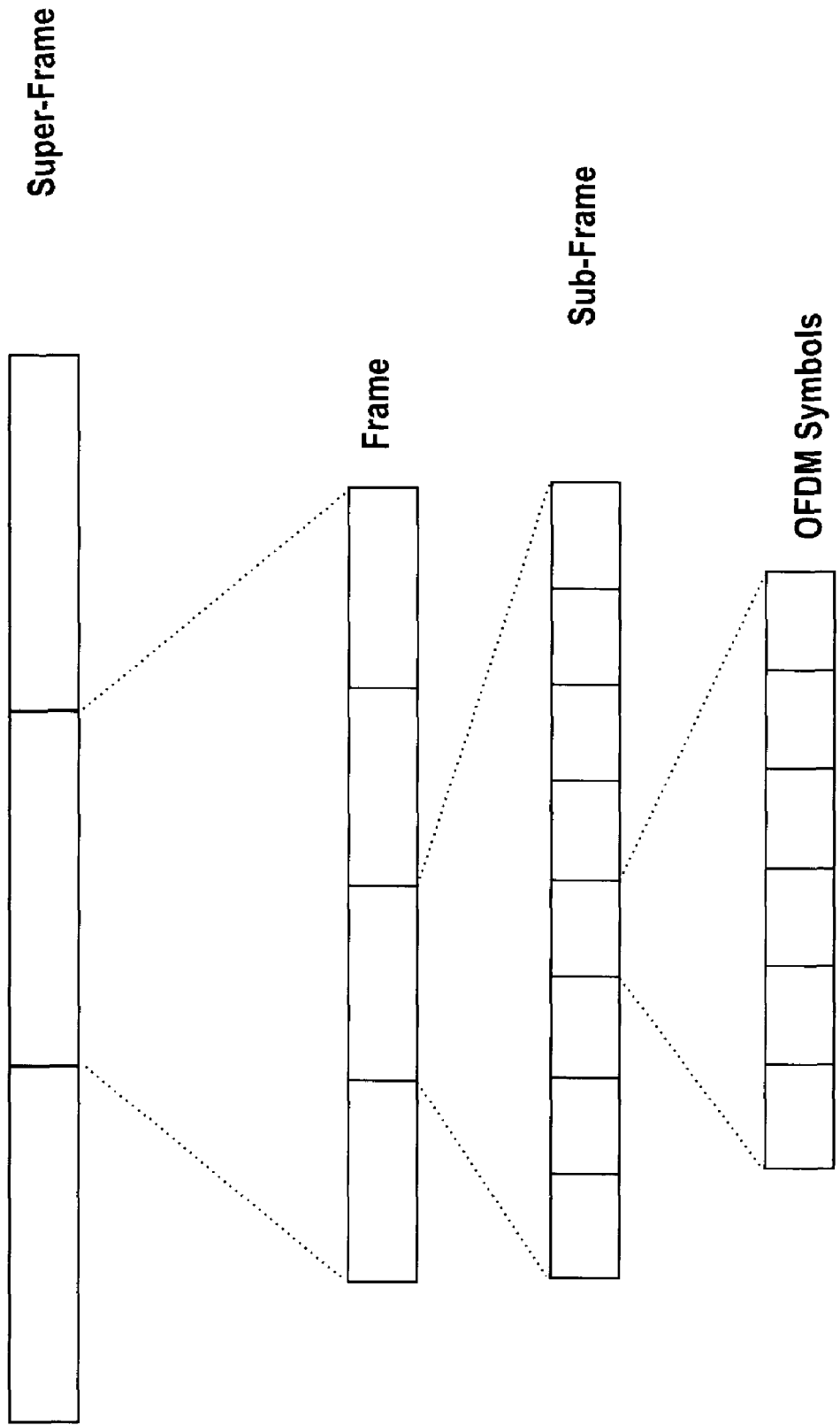
FIG. 2A shows a breakdown of a super-frame into frames, sub-frames, and OFDMA symbols, according to an embodiment of the invention.
Figure 2B:
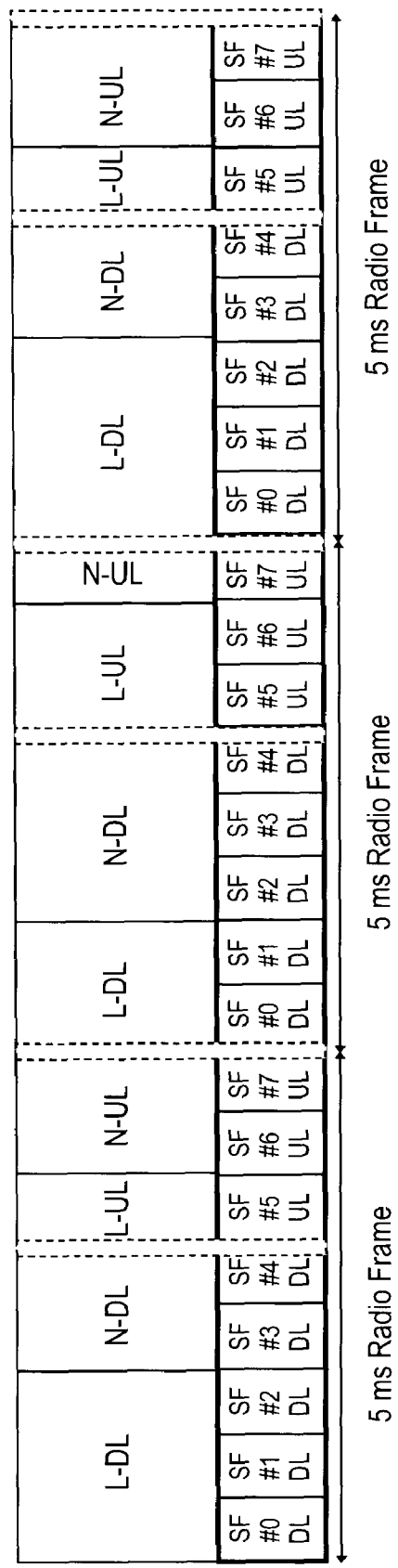
FIG. 2B shows a split of OFDMA frames into legacy and new downlink and uplink zones, according to an embodiment of the invention.

The contents of each frame may follow a particular overall pattern, with the general sections shown at the bottom of FIG. 2B. In a conventional OFDMA TDD (time division duplex) frame, the first portion of the frame may be generally labeled as the downlink section, and the last portion as the uplink section, separated by an idle period called switching point. Thus, the sections shown are labeled generally as legacy downlink (L-DL), new downlink (N-DL), legacy uplink (L-UL), and new uplink (N-UL) zones. In other embodiments the entire downlink or uplink sections can be designated as new if no legacy support is required. Each frame is also shown divided into eight sub-frames (SF), although other embodiments may contain other quantities of sub-frames. The apportionment of those frames between downlink and uplink sections may vary from frame to frame, according to the relative amounts of downlink and uplink traffic. The contents of a TDD frame are shown in more detail in FIG. 3. It must be noted that the present invention is equally applicable to both TDD and FDD duplex schemes and the use of TDD frame examples should not be construed as limiting.

Figure 3:
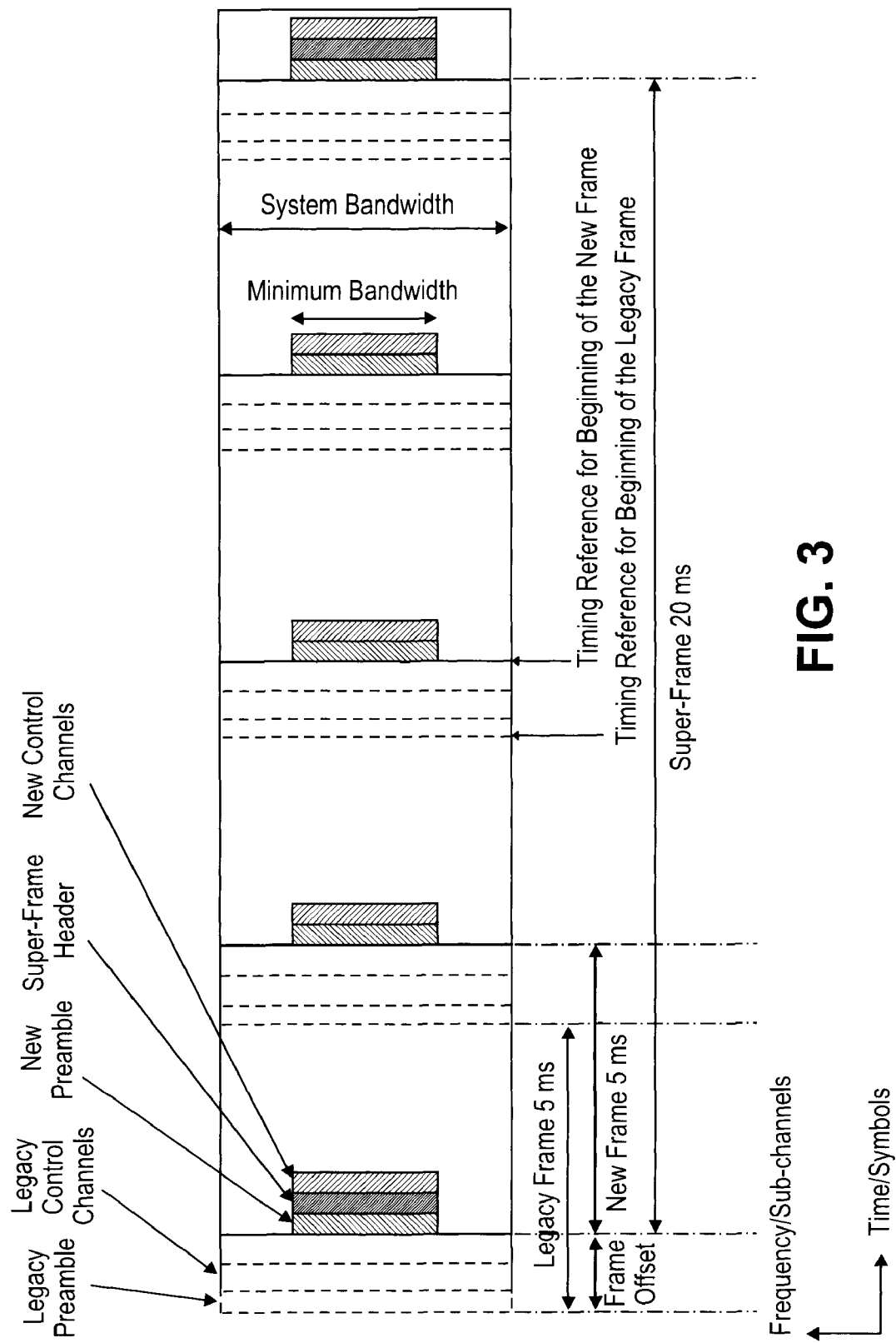
FIG. 3 shows a breakdown of a super-frame, according to an embodiment of the invention.

FIG. 3 shows an OFDMA TDD frame, according to an embodiment of the invention. This new frame is shown in the graphics format typically used for an OFDMA TDD frame, with the y-axis representing frequency in the form of multiple sub-channels, and the x-axis representing time in the form of symbols. The individual sub-channels and the individual symbols are not specifically marked, as the quantity of these may vary. The illustrated super-frame is shown to contain four frames, with each frame containing the same basic sections, with the same internal timing relationships, as the other frames, with the exception of the super-frame header which is shown only in the first frame of the super-frame. Because the frame may be designed to be useful with legacy SS's as well as new SS's, the frame starts with portions compatible with legacy SS's. The frame starts with a legacy preamble, to allow the legacy SS's to synchronize on the signals. It is expected new SS's will be backwards compatible, allowing them to also synchronize on the legacy preamble and correctly interpret the other legacy sections in the frame, if needed, but this may not be a requirement of various embodiments of the invention. Following the legacy preamble are the legacy control channels, which may include a downlink map (DL-MAP) and an uplink map (UL-MAP) that are not specifically illustrated, which may include pointers to identify where in the Legacy DL zone (symbols and sub-channels) to find packets being transmitted to specified SS's. The UL-MAP contains pointers to identify where in the Legacy UL zone (symbols and sub-channels) that specified SS's may transmit packets to the BS. In some cases, the DL-MAP and/or UL-MAP may also contain indirect pointers, that identify where in the Legacy DL Zone to find additional pointers that locate the actual data packets.

The New DL zone and New UL zone are considered exclusively for new SS's that are capable of using the new features described herein. In general, legacy SS's will simply ignore these areas (since they will not receive pointers to these areas in the DL-MAP or UL-MAP). To allow new SS's to synchronize on the radio frame and transmit/receive downlink/uplink traffic a new preamble (NP) is included in the DL frame (i.e., DL frame in FDD systems or DL section of the TDD frame). The new preamble marks the beginning of the new radio frame boundary. Hence, a legacy frame and a new frame may overlap in time (see FIG. 3), but the legacy SS's may ignore the time periods in the legacy frame devoted to new SS's, while the new SS's may ignore (or participate in, if configured to also handle legacy data) the time periods in the new frame devoted to the legacy SS's. As mentioned earlier, the new super-frame header (SFH) may contain system configuration information (SCI) and may appear in the first frame of each super-frame. In some embodiments, the first frame in the super-frame is defined as the frame containing the SFH. The SFH may be located at a fixed location relative to the new preamble in the time domain. In some embodiments this system configuration information may be in a Broadcast Channel (BCH) section within the SFH.

The new preamble allows the new SS's to synchronize with the radio frame, and indicates that the immediately following symbols contain the SFH, if the current frame is the first frame in the super-frame. Note that the SFH may occupy one, two, or more OFDMA symbols in the time-domain depending on the amount of information it carries. This placement may or may not correspond to the start of the New DL zone as it is shown in FIG. 2B. This variability is due to the fact that the placement of the super-frame preamble may be fixed in the new frame, but the start of the New DL zone may vary from frame to frame, based on the percentage of new and legacy traffic that is scheduled in the downlink or uplink sub-frames in the current frame. By placing the SFH (or the broadcast channel) at a pre-determined and fixed location in the new frame, the receiving new SS's can acquire system configuration information following synchronization to the new frame, thus eliminating some unnecessary steps in the initialization procedure, which can result in a power savings by reducing the amount of data to be processed.

In some embodiments, the radio frame may be designed only for new SS's, and legacy SS's are not accommodated. In these embodiments, the legacy portions of the frame may be eliminated, and the super-frame preamble may be located at the beginning of the frame.

The new preamble and super-frame header may only use a sub-set of the available sub-channels in the frame, those sub-channels being located in the center frequencies (as shown in FIG. 3). In some embodiments, the number of sub-channels used for this purpose will be no greater than the number of sub-channels that correspond to the minimum bandwidth designated for the frame. (Some SS's can only process a small number of sub-channels, and the minimum bandwidth is specified for the benefit of those SS's.) By limiting the new preamble and super-frame header to this minimum bandwidth, it is assured that these SS's will be capable of decoding the new preamble and the broadcast channel irrespective of their radio frequency bandwidth capabilities. The BS is responsible for assuring it does not assign sub-channels to these devices that they are incapable of handling.

FIG. 4 shows a table of system configuration information included in the super-frame header, according to an embodiment of the invention. The illustrated contents of this table are only an example, and other embodiments may contain more, fewer, and/or different fields than those shown. The illustrated fields are also shown as mandatory system configuration information (MSCI), or information that is so widely useful that it should be included in every instance of the table. However, some tables may also include some configuration-dependent system configuration information (CSCI), or information that is only useful for particular configurations or deployment scenarios. To handle various operations, there may be a standardized set of tables for the BS to choose from, with each set having a predetermined table size, predetermined fields, and predetermined size for each field, as well as some way for the receiving SS's to identify which table is being presented.

In the illustrated embodiment, the fixed offset between the beginning of the legacy frame (i.e., the OFDMA symbol containing the legacy preamble) and the beginning of the new frame (i.e., the OFDMA symbol containing the new preamble) may be included in the super frame header. Alternately, the fixed offset may be specified by an industry-wide standard or network operator, in which case it would not be necessary to specify it in the super-frame header.

Figure 5:
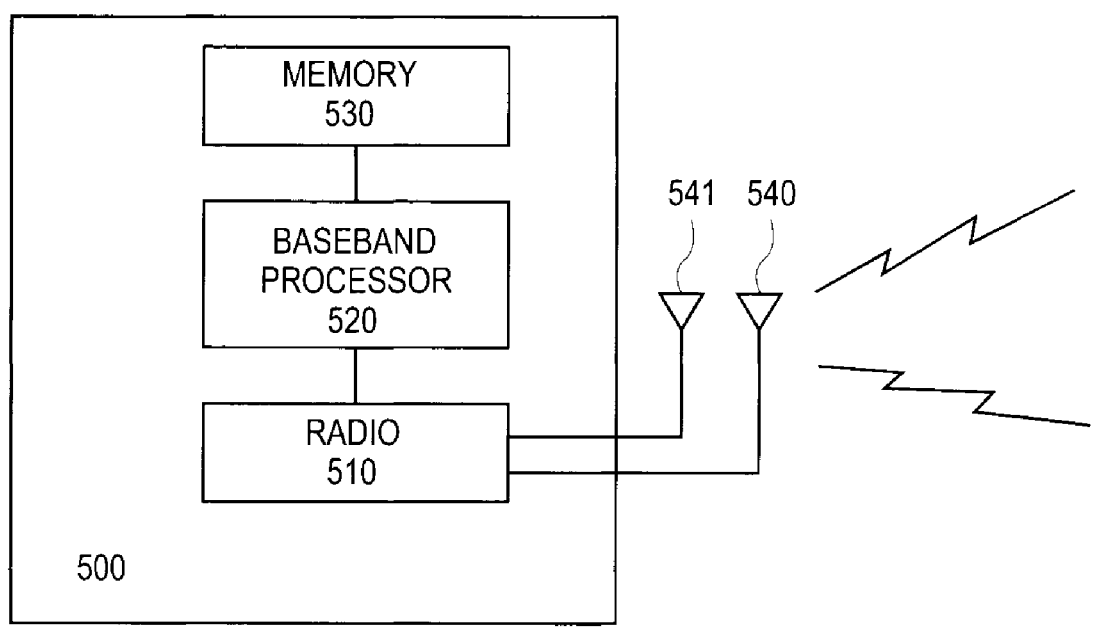
FIG. 5 shows a wireless communications device, according to an embodiment of the invention.

FIG. 5 shows a wireless communications device, according to an embodiment of the invention. Device 500 might represent either a base station or a subscriber station, and have some or the entire novel features described herein. Device 500 may include at least one medium access control (MAC) and physical layer (PHY) processor 520 collectively known as baseband processor coupled to a memory 530 containing instructions, which when executed, and in combination with the other portions of the device, enable the device to perform the operations described herein. Radio 510 may be coupled to the baseband processor 520 and antenna 540. Some embodiments may contain multiple antennas (such as antennas 540, 541, and possibly additional antennas not shown), to enable such multi-antenna communication techniques as multiple-input multiple-output (MIMO) and/or spatial division multiple access (SDMA).

Figure 6A:
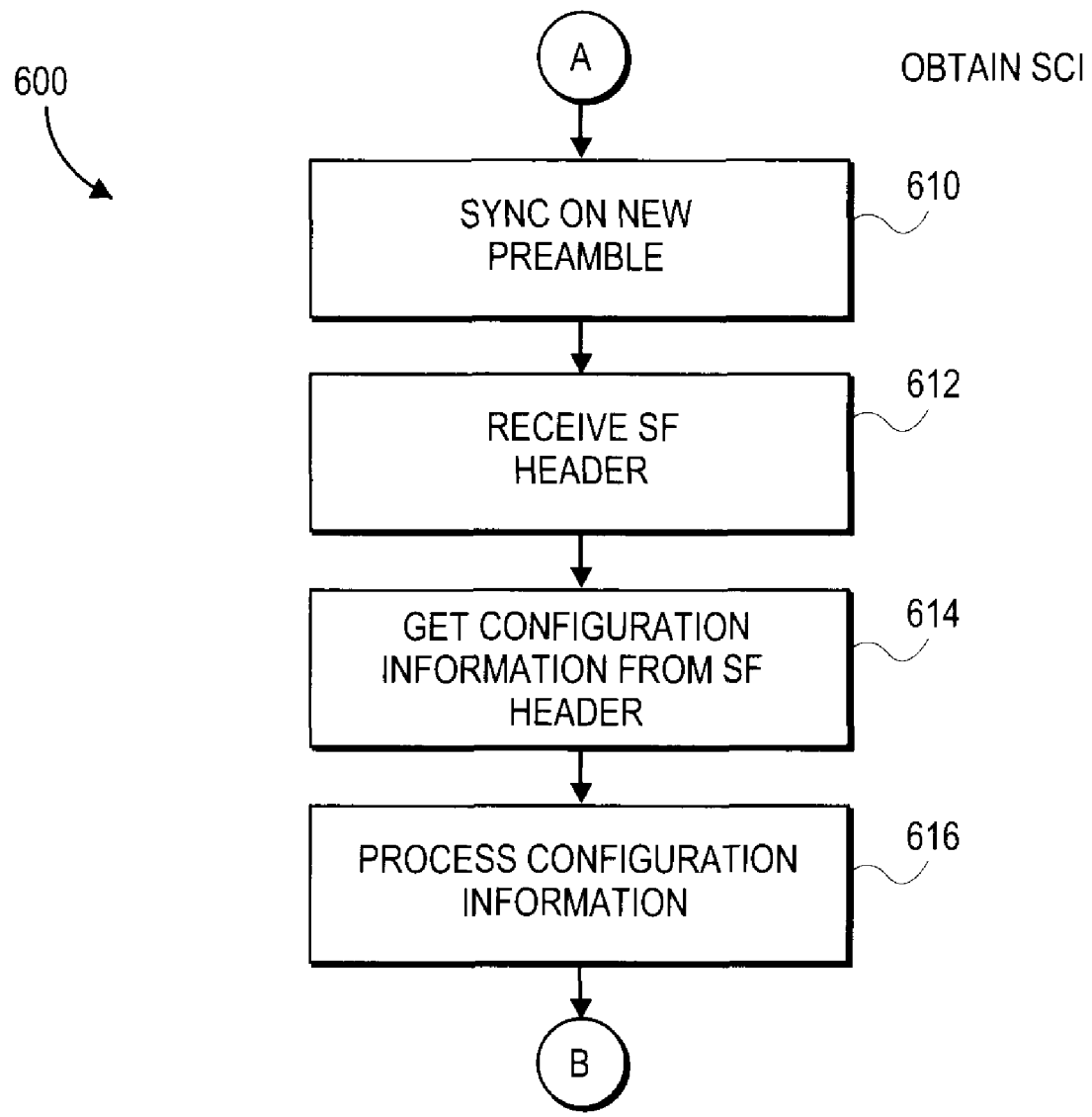
FIGS. 6A-C show flow diagrams for obtaining/using system configuration information, according to an embodiment of the invention.
Figure 6B:
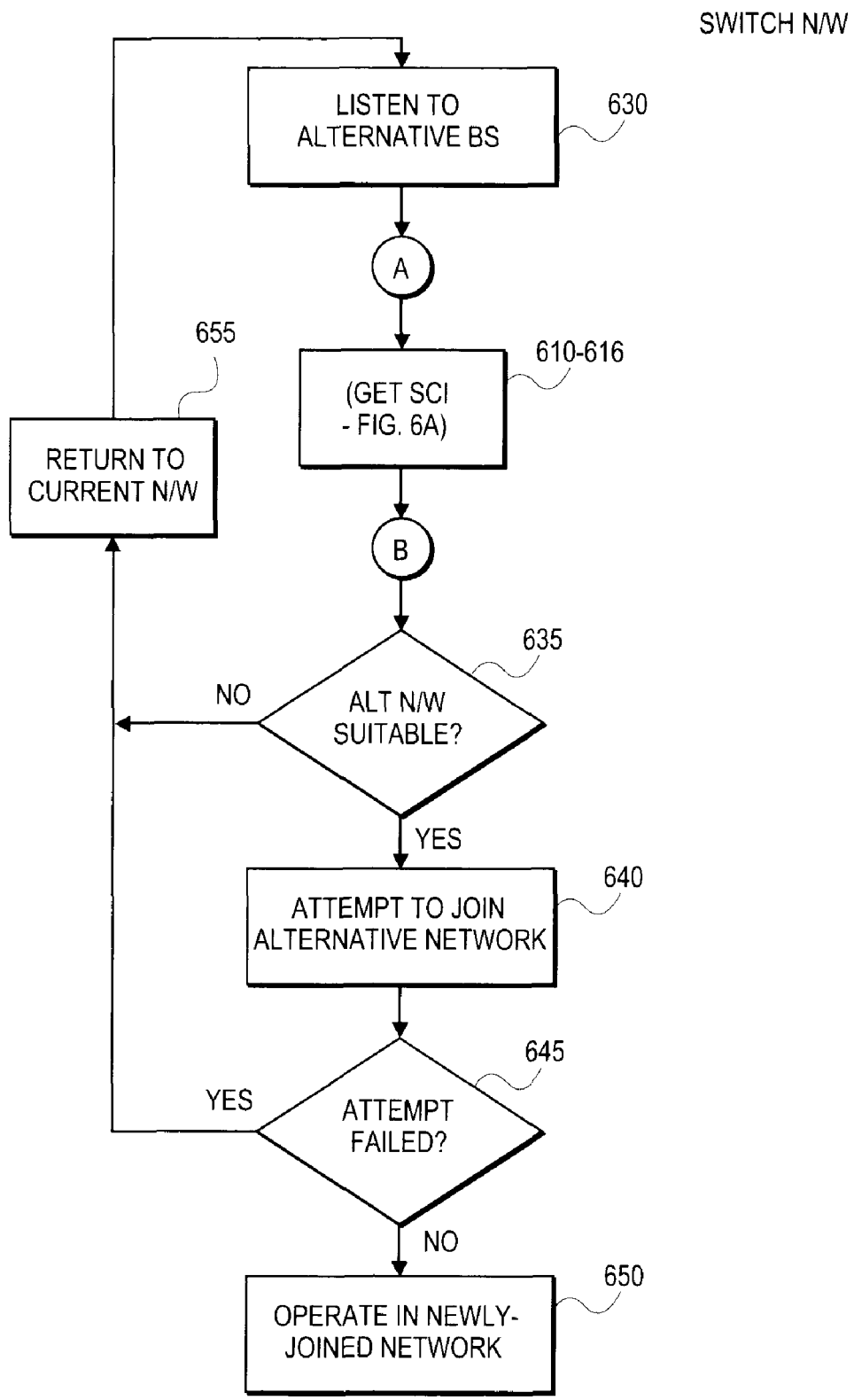
Figure 6C:
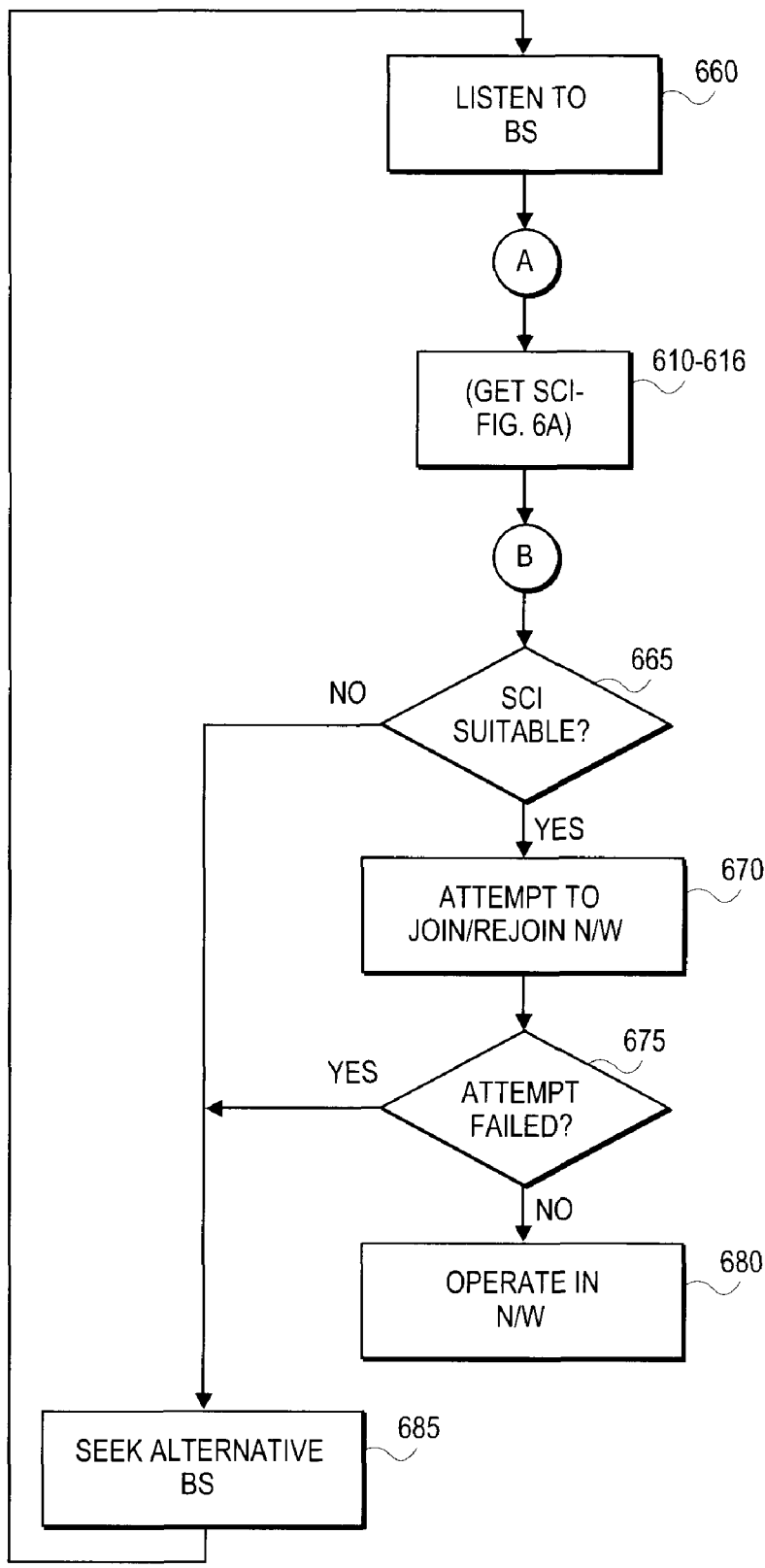

FIGS. 6A-C show a flow diagram of a method of obtaining/using system configuration information, according to an embodiment of the invention. This method may be performed by a subscriber station (SS) that receives the indicated frame from a base station (BS). In flow diagram 600, FIG. 6A shows a method of obtaining the system configuration information (SCI) from a base station that is transmitting a frame according to the techniques described herein. Reference may be made to FIG. 3 to see the various parts of the frame that are mentioned in FIG. 6A. At 610, the SS may synchronize on the new preamble of the received frame to determine where the start of the new frame is.

Following successful detection of a new preamble, the SFH is received at 612. (In some instances, the first received preamble may not belong to the first frame of the super-frame, so the SS should repeat 610 for succeeding preambles until it detects a SFH immediately after a new preamble). The SFH contains the SCI. In some embodiments, the SCI may be in a Broadcast Channel section of the SFH. The system configuration information is obtained from the header at 614, and processed at 616 to obtain the necessary parameters. This information may then be used in various ways. FIGS. 6B and 6C show two possible ways in which the information may be used, although various embodiments may use the information in other ways. FIGS. 6B and 6C each shown an entry point A into FIG. 6A and an exit point B from FIG. 6A.

FIG. 6B shows a method of using the SCI to assist in finding a suitable alternative network, so that the SS may switch to a different network. This switch may be made for various reasons, such as but not limited to: 1) the current network is too congested, 2) the SS is moving out of the coverage area of the current network, 3) the current network does not have certain desirable features, 4) etc. At 630, the SS listens for transmissions from a base station other than its current base station, to determine if that base station is controlling a suitable network.

When a super-frame header is received from the BS, the SS can examine that frame and extract the relevant SCI from it, by following the process in FIG. 6A. Based on that SCI, the SS can determine at 635 if this alternate network is suitable to join. If not, the SS can return to its current BS at 655, and try a different alternative BS (if any are within range) by restarting at 630. However, if the SCI indicates at 635 that this new network is suitable (there may also be other reasons to decide if the alternate network is suitable, but that determination is beyond the scope of this disclosure), then the SS may attempt to join this new network at 640, and operate in this new network at 650. If the attempt to join fails, as determined at 645, the SS may again return to the old BS at 655, or attempt to find another alternate network to join. In some instances, if multiple networks are within range, the SS may determine if multiple ones of those networks are suitable to join by repeating the loop at 630-635-655, and then choose which one of those networks to attempt joining at 640.

FIG. 6C shows a method of using the SCI to assist in finding a suitable network to join (e.g., when not currently associated with any network) or rejoin (e.g., after exiting a sleep mode). The SS may monitor the channel(s) until it locates a BS (it may be the current BS, if rejoining), and listen to that BS at 660. The process of FIG. 6A may then be used to extract SCI from that BS. If the SCI indicates that this network is not a suitable network to join, as indicated at 665, the SS may continue searching at 685 for other BSs to monitor, and begin the process again when a candidate BS is found. However, if the SCI indicates that this network is suitable, the SS may attempt to join/rejoin it at 670. If the attempt to join is successful, the SS may then begin operating in this network at 680. If the attempt is unsuccessful, as determined at 675, then the SS may again search for another BS at 685. This process may be repeated as many times as necessary until a suitable network is joined.

The foregoing description is intended to be illustrative and not limiting. Variations will occur to those of skill in the art. Those variations are intended to be included in the various embodiments of the invention, which are limited only by the spirit and scope of the following claims.

What is claimed is:

1. An apparatus, comprising a communications device comprising a processor, a memory coupled to the processor, and a radio coupled to the processor to communicate wirelessly over multiple sub-channels in an orthogonal frequency division multiple access wireless network, the device to:
process a super-frame containing multiple sequential frames for communication in a wireless communications network;
wherein an initial frame of the multiple frames is to contain system configuration information for the network in a pre-determined location in the initial frame;
wherein the pre-determined location is offset from a start of a preamble of a legacy frame by a pre-determined number of symbols, the pre-determined location is to be in a broadcast channel section of a super-frame header, and the super-frame header is to be contained only in sub-channels within a designated minimum required bandwidth for the frame.

2. The apparatus of claim 1, comprising multiple antennas coupled to the radio.

3. The apparatus of claim 1, wherein a particular item of the system configuration information is only to be contained in every nth super-frame, where n is an integer.

4. A method, comprising:
processing, in a network device, a super-frame containing multiple sequential frames for communication in a wireless communications network using orthogonal frequency division multiple access (OFDMA) techniques;
wherein a particular frame of the multiple frames contains system configuration information for the network in a pre-determined location in the initial frame; and
wherein the pre-determined location is in a broadcast channel section of a super-frame header, and the super-frame header is contained only in sub-channels within a designated minimum required bandwidth for the frame.

5. The method of claim 4, wherein:
the particular frame overlaps a legacy frame in time and in OFDMA sub-channels, the particular frame having a preamble separate in time from a preamble of the legacy frame; and
the preamble of the particular frame is offset from the preamble of the legacy frame by a predetermined number of OFDMA symbols.

6. The method of claim 4, wherein particular system configuration information is contained in intervals of every nth super-frame, but is not contained in intervening super-frames between each nth super-frame, where n is an integer value.

7. The method of claim 4, wherein said processing comprises processing the super-frame to be transmitted from a base station.

8. The method of claim 4, wherein said processing comprises processing a received super-frame in a subscriber station.

9. The method of claim 8, wherein said processing is part of examining the system configuration information for a target base station.

10. The method of claim 8, wherein said processing is part of examining the system configuration information for network re-entry.

11. The method of claim 8, wherein said processing is carried out only for the particular frame in the super-frame containing a super-frame header.

12. An article comprising
a non-transitory machine-readable medium that contains instructions, which when executed by one or more processors result in performing operations comprising:
processing, in a network device, a super-frame containing multiple sequential frames for communication in a wireless communications network using orthogonal frequency division multiple access (OFDMA) techniques;
wherein an initial frame of the multiple frames contains system configuration information for the network in a pre-determined location in the initial frame; and
wherein the pre-determined location is in a broadcast channel section of a super-frame header, the broadcast channel section being separated from the preamble of the initial frame by a pre-determined number of OFDMA symbols, and the super-frame header is contained only in sub-channels within a designated minimum required bandwidth for the frame.

13. The article of claim 12, wherein:
the initial frame overlaps a legacy frame in time and in OFDMA sub-channels; and
the initial frame has a preamble that is delayed from a preamble of the legacy frame by a pre-determined number of OFDMA symbols.

14. The article of claim 12, wherein particular system configuration information is contained in intervals of every mth super-frame, but is not contained in the intervening super-frames between each mth super-frame, where m is an integer value.

15. The article of claim 12, wherein the operation of processing comprises processing the super-frame to be transmitted from a base station.

16. The article of claim 12, where the operation of processing comprises processing a received super-frame in a subscriber station.

17. The article of claim 16, wherein the operation of processing is part of examining the system configuration information for a target base station.

18. The article of claim 16, wherein the operation of processing is part of examining the system configuration information for network re-entry.

* * * * *

UNITED STATES PATENT AND TRADEMARK OFFICE
CERTIFICATE OF CORRECTION

PATENT NO. : 8,175,022 B2  
APPLICATION NO. : 11/960539  
DATED : May 8, 2012  
INVENTOR(S) : Sassan Ahmadi et al.

Page 1 of 1

It is certified that error appears in the above-identified patent and that said Letters Patent is hereby corrected as shown below:

On the Title page, in field (56), in column 2, under "Other Publications", line 1, delete "Methos" and insert --Method--, therefor.

On the Title page, in field (74), in column 2, in "Attorney, Agent or Firm", line 1, delete "Patents," and insert --Patent,--, therefor.

On sheet 2 of 9, in Figure 2A, line 4, delete "OFDM" and insert --OFDMA--, therefor.

On sheet 5 of 9, in Figure 4, line 32, delete "grouip" and insert --group--, therefor.

In column 8, line 43, in claim 16, delete "where" and insert --wherein--, therefor.

Signed and Sealed this  
Tenth Day of July, 2012

David J. Kappos  
*Director of the United States Patent and Trademark Office*